United States Patent
Mc Cullough et al.

(10) Patent No.: US 7,112,894 B2
(45) Date of Patent: Sep. 26, 2006

(54) METHOD, PROGRAMMING INTERFACE AND MECHANISM FOR CHANGING VEHICLE PERSONALIZATION SETTINGS/FEATURES

(75) Inventors: Scott A. Mc Cullough, Sterling Heights, MI (US); David A. Osinski, Sterling Heights, MI (US); John E. Paluch, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 483 days.

(21) Appl. No.: 10/410,574

(22) Filed: Apr. 9, 2003

(65) Prior Publication Data

US 2004/0201284 A1 Oct. 14, 2004

(51) Int. Cl.
*B60L 1/00* (2006.01)
(52) U.S. Cl. ........................ 307/10.1; 701/36
(58) Field of Classification Search .............. 307/10.1; 701/36
See application file for complete search history.

(56) References Cited

U.S. PATENT DOCUMENTS

| | | | | |
|---|---|---|---|---|
| 4,748,843 A | * | 6/1988 | Schafer et al. | 73/117.3 |
| 5,349,747 A | * | 9/1994 | Dennis | 29/840 |
| 5,821,935 A | * | 10/1998 | Hartman et al. | 715/839 |
| 5,949,149 A | * | 9/1999 | Shitanaka et al. | 307/10.1 |
| 5,986,542 A | * | 11/1999 | Hyde | 340/426.35 |
| 6,704,032 B1 | * | 3/2004 | Falcon et al. | 715/746 |
| 2004/0046751 A1 | * | 3/2004 | Heimermann et al. | 345/184 |
| 2005/0102077 A1 | * | 5/2005 | Mc Cullough et al. | 701/36 |

FOREIGN PATENT DOCUMENTS

NO  200104796 A * 4/2003

* cited by examiner

*Primary Examiner*—Brian Sircus
*Assistant Examiner*—Daniel Cavallari
(74) *Attorney, Agent, or Firm*—Christopher DeVries

(57) ABSTRACT

Methods and apparatus are provided for changing vehicle personalization features. The apparatus comprises a multifunction switch coupled to a multifunction display. The display includes a main menu display configured to display, in response to signals from the switch, in sequence, first numeric codes that are representative of a sequence of settable features and a second numeric code identifying the current selected mode of a given feature. The display also includes a sub-menu display that is configured to display, in response to additional signals from the switch, a first numeric code defining the feature selected to be changed and to display, in sequence, second numeric codes representative of selectable modes of the settable feature. The multifunctional switch is also coupled to an electronic module that is configured to set a selected mode of a settable feature in response to yet a further signal from the switch.

24 Claims, 2 Drawing Sheets

| 14 | 10 | 12 | 16 |
|---|---|---|---|
| 001 | AUTO DOOR LOCK/UNLOCK | DISABLED .................................................. 01<br>ALL DOORS LOCK OUT OF PARK .............. 02<br>ALL DOORS LOCK OUT OF PARK AND ........ 03<br>ALL DOORS UNLOCK INTO PARK | |
| 002 | OIL LIFE | DISABLE ..................................................... 01<br>RESET ........................................................ 02 | |
| 003 | LIGHTS FLASH AT LOCK | ON .............................................................. 01<br>OFF ............................................................. 02 | |
| 014 | LIGHTS ON AT EXIT | 0 SECONDS ................................................ 01<br>10 SECONDS .............................................. 02<br>20 SECONDS .............................................. 03<br>30 SECONDS .............................................. 04 | |

METHOD, PROGRAMMING INTERFACE AND MECHANISM FOR CHANGING VEHICLE PERSONALIZATION SETTINGS/FEATURES

FIELD OF THE INVENTION

The present invention generally relates to a method and mechanism for personalizing the features on a motor vehicle, and more particularly relates to a mechanism utilizing multifunctional switches and displays for personalizing features of a motor vehicle and to a method for programming such mechanism.

BACKGROUND OF THE INVENTION

Programming of personalization features in a motor vehicle such as, for example, the automatic door lock/unlock function (whether or not the doors automatically lock when the vehicle is shifted from "park" and whether or not the doors automatically unlock when the vehicle is shifted into "park") as well as functions such as resetting the "change oil indicator" is presently done in either of two ways. In expensive or "high end" vehicles, such programming is done by one or more switches that are dedicated to the programming function, usually in combination with a dedicated display. Use of dedicated switches and displays is costly because of the added components and may detract from the refined appearance of the dash board. In less expensive or "low end" vehicles, such programming is done by various existing switches available within the vehicle. The number of features that can be programmed in low end vehicles is limited due to the limited number of available switches and the number of unique operations of these switches that can be provided to the vehicle operator without confusion. In existing low end vehicles such programming is often awkward, confusing and non-intuitive. For example, the automatic door lock/unlock function may be performed by pressing and holding the door "lock" switch for a prescribed length of time and listening for and counting the number of times an audible alarm chimes. Alternatively, this function may be programmed by an even less intuitive combination of actions with the turn signal, ignition key, and lock switch.

All of the existing mechanisms and methods for programming operator programmable personalization options are either costly or confusing and non-intuitive. Accordingly, it is desirable to provide mechanisms and methods by which such personalization options can be easily and intuitively programmed without requiring additional dedicated components. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for changing vehicle personalization features. The apparatus comprises a multifunction switch coupled to a multifunction display. The display includes a main menu display configured to display, in response to signals from the switch, a sequence of numeric codes that are representative of a sequence of settable features. The display also includes a sub-menu display that is configured to display, in response to additional signals from the switch, a sequence of numeric codes representative of selectable modes of the settable features. The multifunctional switch is also coupled to an electronic module that is configured to set a selected mode of a settable feature in response to yet a further signal from the switch.

A method is provided for programming personalization features of a motor vehicle. The method comprises the steps of pressing and holding a multifunctional switch for a predetermined length of time to cause a multifunctional display to display a numeric code representative of a first settable feature and to also display a numeric code representative of a presently set mode of the displayed feature. By tapping the switch multiple times, the display is made to sequentially display numeric codes corresponding to additional settable features and numeric codes corresponding to the presently set mode of each of the displayed features. By again pressing and holding the switch when a feature to be changed is displayed, and then by tapping the switch multiple times, numeric codes corresponding to the modes of the selected feature are sequentially displayed. Again pressing the switch for a predetermined length of time when the numeric code representing a desired mode is displayed will cause that mode to be selected.

BRIEF DESCRIPTION OF THE DRAWINGS

The present invention will hereinafter be described in conjunction with the following drawing figures, wherein like numerals denote like elements, and in which.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figures 1, 2:
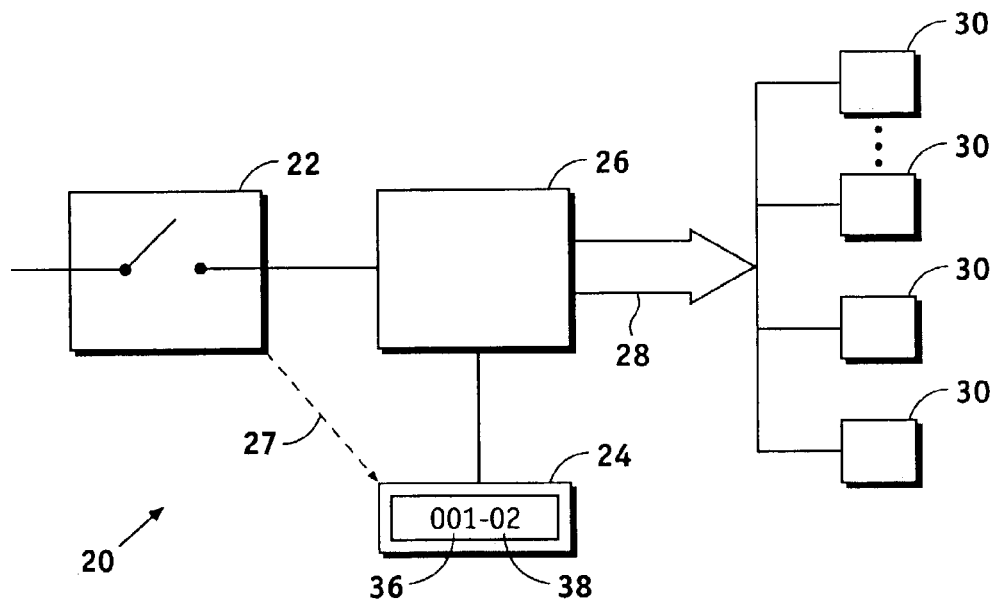
FIG. 1 illustrates, in table form, a sampling of programmable personalization features that can be selected.
FIG. 2 illustrates schematically a mechanism for personalizing features of a motor vehicle in accordance with an embodiment of the invention.

FIG. 1 illustrates, in table form, a sampling of features, functions, and options (hereinafter referred to collectively as "features") that can be set by an operator of a motor vehicle to personalize that vehicle. Column 10 illustrates a number of such features, but this list of features is not meant to be an exhaustive list of personalization options, but rather is only exemplary. Column 12 illustrates, again in an exemplary manner, various modes which may be selected or programmed for each of the features. Column 14 illustrates a menu of numeric codes, each corresponding to one of the features, and column 16 illustrates a sub-menu of numeric codes, each corresponding to one of the modes of the associated feature. Such a table could be included, for example, in the owner's manual for the vehicle for ready reference by the vehicle operator.

FIG. 2 illustrates schematically a mechanism 20, in accordance with one embodiment of the invention, by which an operator of a motor vehicle could select and set the modes of operation for each of the programmable features of the vehicle. Mechanism 20 includes a multifunctional switch 22, a multifunctional display 24, and an electronic control module 26. By "multifunctional switch" is meant a switch that has at least one other function besides its function in personalizing the options of the vehicle. A multifunctional switch thus is different than a dedicated switch that is dedicated to the option personalization function. In similar manner, by "multifunctional display" is meant a display that has at least one other function in addition to its use in programming personalization features of a motor vehicle in accordance with the invention. In accordance with one embodiment of the invention, the multifunctional switch is an odometer trip reset switch (or stem). The odometer trip reset switch is normally used only to reset the trip odometer, but in accordance with this embodiment of the invention is also used to select and set programmable features of the vehicle. The multifunctional switch is illustrated as being simply a single pole switch, but can be a more complicated switch as needed and as will be apparent to those of skill in the art. In accordance with an embodiment of the invention, multifunctional display 24 is an odometer display. The odometer display is normally used only to display the total miles the vehicle has been driven and/or the number of miles driven on a trip, but in accordance with this embodiment of the invention is also used to display the numeric codes of the menu and sub-menu as will be explained more fully below. The multifunctional switch and multifunctional display could be any switch and display accessible to the vehicle operator, but the use of the odometer trip reset switch and the odometer display provide a handy combination, the joint use of which is intuitive to the operator. Electronic control module 26 can be part of any vehicle control module, a microcontroller, microprocessor, or other computer device.

Multifunctional switch 22 is coupled to electronic control module 26, and the electronic control module is coupled to multifunctional display 24. The multifunctional switch is thus coupled indirectly (as indicated by the dotted line 27) to the multifunctional display through the electronic module to form a programming interface. The programming interface provided by switch 22, display 24, and electronic control module 26 provides a user friendly method for the programming of personalization features of the motor vehicle by the operator as will be explained more fully below. The electronic control module is also coupled, as schematically indicated by bus 28 to a plurality of feature implementers 30 (illustrated only as a plurality of boxes). For example, electronic control module 26 can be coupled to another electronic control module on the vehicle to control a door locking/unlocking mechanism that implements the selected mode of an automatic door lock/unlock feature. The function of electronic control module 26 in selecting and setting a mode of a programmable feature can be centralized in a single electronic control module, or the function can be distributed with a central control module sending control signals to other remote control modules.

Figure 3:
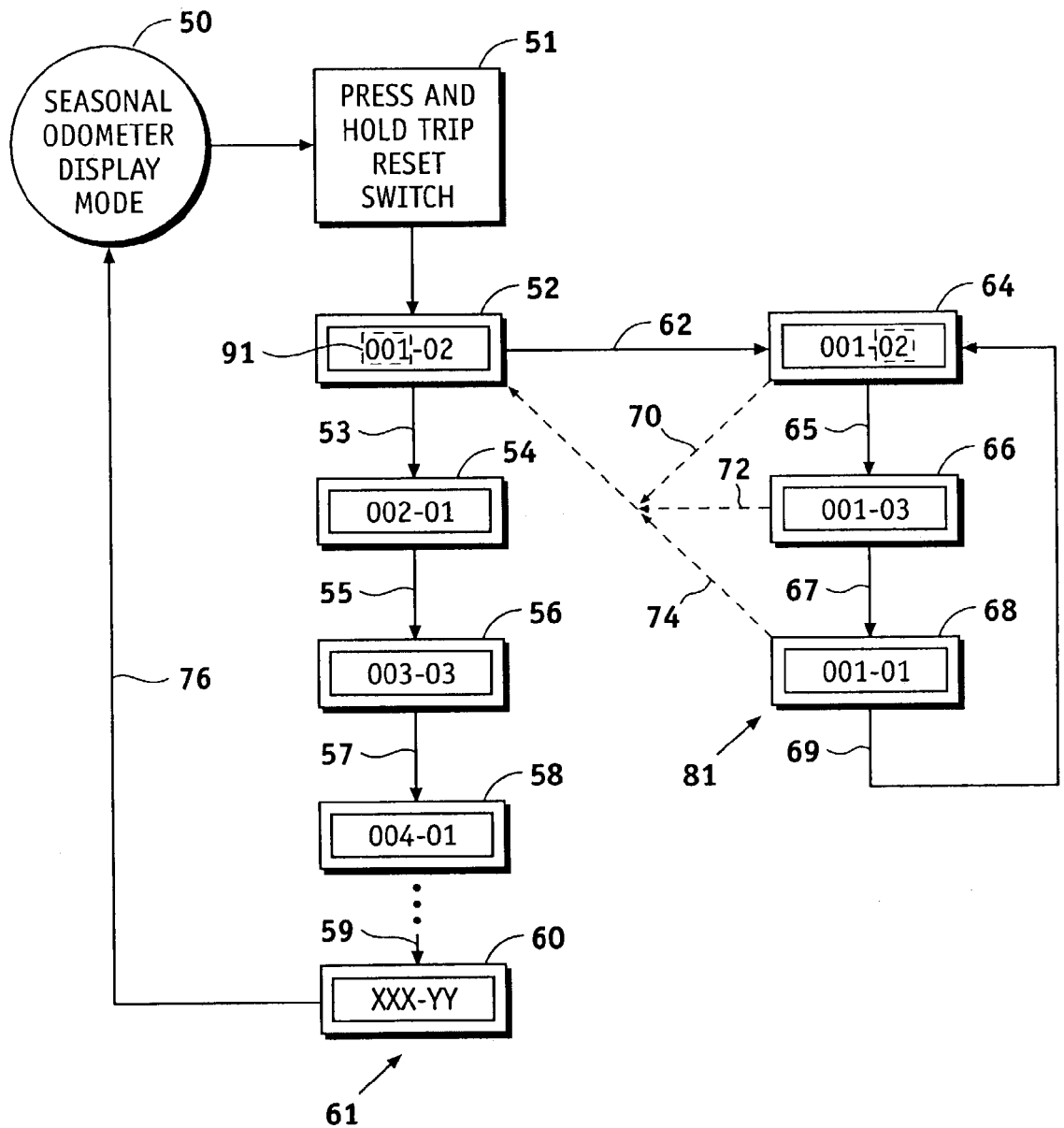
FIG. 3 illustrates diagrammatically the personalization of selectable features of a motor vehicle in accordance with one embodiment of the invention.

FIG. 3 illustrates diagrammatically a method for utilizing a mechanism such as that illustrated in FIG. 2 for changing vehicle personalization features in accordance with one embodiment of the invention. For purposes of convenient illustration only, but without limitation, the method will be described and illustrated by reference to an embodiment in which the multifunctional switch is an odometer trip reset switch and the multifunctional display is an odometer display. As those of skill in the art will appreciate, the invention is not limited to such an illustrative embodiment and other switches and other displays could also be used.

In accordance with one embodiment of the invention, the programming process is started with the vehicle ignition in the "ON" or "RUN" position or state and with the transmission, if automatic, in park. If the vehicle has a manual transmission, the process is started with the vehicle ignition in the "ON" or "RUN" position or state but the vehicle stationary as determined by the vehicle speed being zero miles per hour or kilometers per hour. The odometer trip reset switch (hereinafter simply "switch") and odometer display are set to the season display, circle 50, not to the trip display.

The personalization programming process is illustrated in FIG. 3 with continued reference to FIG. 2. To initiate the programming process, switch 22 is pressed, held for a predetermined length of time such as a time of 3–10 seconds, and then released, as illustrated by box 51 in FIG. 3. Holding the switch for the predetermined length of time (a first setting of the switch) sends a signal to electronic control module 26. In response to this signal, the electronic control module sends a signal to odometer display 24 that sets the display in the programming mode. In the programming mode the display includes a first display element 36 and a second display element 38 (as illustrated in FIG. 2). The change in the display from odometer setting to programming display will indicate to the operator that the switch has been held down for the required length of time. The first display element displays a feature code indicative of a programmable feature and the second display element displays a mode code indicative of a mode of that feature. Preferably, the codes are numeric codes, exemplary ones of which are illustrated in columns 14 and 16, respectively, of FIG. 1.

Continuing the programming process illustrated in FIG. 3 and with continued reference to FIG. 2, the pressing and holding of switch 22 causes display 24 to display a feature code indicative of a first personalization feature and a mode code indicative of the presently set mode of that feature as indicated by box 52. Preferably the feature code will be highlighted in some manner to indicate visually to the operator that the feature to be programmed is selectable. The highlighting can be, for example, a brightening of the display, a color change, or the like. Most preferably, the highlighting is accomplished by causing the display to flash at some visually discernable rate such as a rate of about 1 Hertz (Hz). The flashing (or other highlighting) of the feature code is indicated in FIG. 3 by the dotted line 91 around the feature code; the dotted line may or may not actually be displayed. The operator can scroll through the list of programmable features by tapping switch 22. By "tapping" switch 22 (which is a second setting of the switch) is meant that the switch is pressed and held for a time less than the predetermined time discussed above. Preferably tapping the switch means pressing the switch for less than about 1–2 seconds and then releasing. Each sequential tap of switch 22 sends a signal to the electronic control module. In response to each of these sequential signals, the electronic control module sends a signal to the display causing the display to display a feature code representative of one of the sequence of features and a mode code representative of the presently set mode for that feature as illustrated by boxes 54, 56, 58, and 60. Boxes 52, 54, 56, 58, and 60 make up a main menu 61 of selectable and programmable features. Arrows 53, 55, 57, and 59 indicate sequential single taps of switch 22. By sequentially tapping switch 22 the operator is able to view the feature codes of each available feature and the mode code indicating the presently set mode of each of the programmable features. As explained above, in a preferred mode, as each feature code and associated mode code is displayed, the feature code is highlighted to indicate to the operator that the feature is programmable.

For any of the programmable features, the operator can change the currently programmed mode to some other mode. FIG. 3 illustrates the manner in which a feature is programmed in accordance with one embodiment of the invention. In this exemplary example, the first feature, represented by box 52, is changed, although the programming could be applied to any (or all) of the other features. To apply the programming to any of the other features, the operator would scroll through the list of features by sequentially tapping switch 22 until the code for the desired feature was displayed. The operator would then initiate the following programming procedure. As illustrated, the feature represented by the numeric display "001"is presently in the mode represented by the numeric display "02." To change the mode of this feature, switch 22 is again pressed and held for the predetermined length of time. This repeated first setting of switch 22, after the programming process has been initiated, sends another signal to electronic control module 26. In response to the additional signal from switch 22, the electronic control module sends a signal to display 24, as indicated schematically by arrow 62, placing the display and the electronic module in the mode setting sub-menu. Again, the; change in the display will indicate to the operator that the switch has been held down for the required length of time. In a preferred mode, the numeric display representing the mode is highlighted indicating to the operator that the mode of the feature is now selectable. Most preferably, the numeric display representing the mode is highlighted by flashing at a visually discernable rate such as a rate of about 1 Hz.

With the programming mechanism in the mode selecting sub-menu, the operator can scroll through the options available for the selected feature by again sequentially tapping switch 22. Each sequential tapping of switch 22 sends a signal to electronic control module 26. In response to each of these sequential signals, the electronic control module sends a signal to the display causing it to display a feature code representative of the selected feature and a mode code representative of the available modes for the selected feature, preferably starting with the presently set mode for that feature as illustrated by boxes 64, 66, and 68. Boxes 64, 66, and 68 make up a sub menu 81 of programmable modes of the selected feature. Arrows 65, 67, and 69 indicate single taps of switch 22. By sequentially tapping switch 22 the operator is able to view mode codes representative of all the modes available for the selected feature. In a preferred mode, with each display of a mode code and its associated feature code, the mode code is highlighted to indicate to the operator that that mode can be selected.

To select a desired mode for a selected feature, the operator presses and holds switch 22 for a predetermined length of time when that desired mode is displayed on display 24. The act of pressing and holding switch 22 sends a signal to electronic control module 26 and the electronic control module, in response to that signal, sends a control signal to the necessary feature implementer 30 to implement the feature change. In a preferred embodiment, electronic control module 26 also sends a signal to display 24. The numeric display representing the mode stops flashing (or otherwise becomes non-highlighted) in response to this signal to provide feedback to the operator indicating that the change has been made.

Following the change in mode of a feature as just explained, the electronic control module also causes mechanism 20 to return to the main menu on display 24. The return to the main menu is indicated by the dashed arrows 70, 72, and 74. Three arrows are shown because, in this illustrative embodiment, the return to main menu could be from any one of the modes represented by boxes 64, 66, or 68. In a preferred embodiment of the invention, when the display returns to the main menu, the feature code is again highlighted and the mode code is non-highlighted. Once returned to the main menu, the operator can continue to sequence through the remaining features by tapping switch 22. As each feature code is displayed, the operator has the option of changing the mode associated with that feature or leaving it in the present, mode. The programming mode can be exited by cycling through all of the feature options and then tapping switch 22 one more time to return to the season odometer display mode as indicated by arrow 76.

In the above description, reference has been made to pressing and holding switch 22 or simply tapping switch 22 as the first and second settings of the switch, respectively. This description is particularly applicable to a stem-type, normally open, odometer trip reset switch. Other types of switches may also be present in a motor vehicle and may be used in the present invention such as, for example, toggle-type switches or rotary switches. For such switches the first and second settings of the switch may be, for example, left and right switch positions. Accordingly, it is not intended that the invention be limited to any one type of switch, but rather it is intended to include within the invention all such switch types.

While at least one exemplary embodiment has been presented in the foregoing detailed description of the invention, it should be appreciated that a vast number of variations exist, such as the just described choice of switch types. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A programming interface for charging vehicle personalization features comprising:
   a single multifunctional switch configured, in a feature personalization mode, to first select a personalization feature and to second select a desired mode of that personalization feature; and
   a multifunctional display, the display, in a feature personalization mode, comprising:
   a first display element configured to display a field indicative of a selected personalization feature; and
   a second display element configured to display a second field indicative of selectable modes of the personalization feature;
   each of the first and second display elements operative in response to a control signal from, the single multifunctional switch;
   wherein the multifunctional switch comprises an odometer trip reset switch.

2. The programming interface of claim 1 wherein the multifunctional display comprises an odometer display.

3. A programming interface for changing vehicle personalization features comprising:
   a single multifunctional switch configured, in a feature personalization mode, to first select a personalization feature and to second select a desired mode of that personalization feature; and a multifunctional display, the display, in a feature personalization mode, comprising:
a first display element configured to display a field indicative of a selected personalization feature; and
a second display element configured to display a second field indicative of selectable modes of the personalization feature;
each of the first and second display elements operative in response to a control signal from the single multifunctional switch;
wherein the multifunctional display comprises an odometer display.

4. A programming interface for changing vehicle personalization features comprising:
a single multifunctional switch configured, in a feature personalization mode, to first select a personalization feature and to second select a desired mode of that personalization feature; and
a multifunctional display, the display, in a feature personalization mode, comprising:
a first display element configured to display a field indicative of a selected personalization feature; and
a second display element configured to display a second field indicative of selectable modes of the personalization feature;
each of the first and second display elements operative in response to a control signal from the single multifunctional switch;
wherein the first display element comprises a first numeric display configured to display a first numeric code corresponding to one of a plurality of settable features and wherein the second display element comprises a second numeric display configured to display a second numeric code corresponding to one of a plurality of modes of the one of a plurality of sortable features.

5. The programming interface of claim 4 wherein the first numeric display comprises a display configured to sequentially display a plurality of first numeric codes in response to multiple sequential signals from the multifunctional switch.

6. The programming interface of claim 5 wherein the second numeric display comprises a display initially configured to indicate a currently selected mode of a settable feature for which the first numeric display displays a numeric code.

7. The programming interface of claim 6 wherein the second numeric display comprises a display configured to sequentially display, in response to additional multiple sequential signals from the multifunctional switch, additional numeric codes corresponding to additional modes of the feature for which the first numeric display displays a numeric code.

8. A mechanism for changing vehicle personalization features comprising:
a single multifunctional switch configured to generate, in a feature selecting mode, a first signal to display a plurality of personalization features, a second signal to display a plurality of modes of one of the plurality of personalization features, and a third signal to select a desired one of the plurality of modes of the one of the plurality of personalization features:
an electronic module coupled to receive the third signal generated by the multifunctional switch and configured to implement the selected one of the plurality of modes of the one of the plurality of personalization features; and
a multifunctional display coupled to the multifunctional switch comprising a first display element and a second display element and configured to display, in a feature selecting mode, an indication of one of the plurality of personalization features in the first display element in response to the first signal and to display an indication of a mode of the one of the plurality of personalization features in the second display in response to the second signal;
wherein the multifunctional switch comprises an odometer trip reset switch.

9. The mechanism of claim 8 wherein the multifunctional display comprises an odometer display.

10. A mechanism for changing vehicle personalization features comprising:
a single multifunctional switch;
a multifunctional display coupled to the switch, the display configured to display, in response to a first setting of the switch, a first numeric code representative of a first vehicle personalization feature and a second numeric code representative of a current setting of a mode of the first vehicle personalization feature, and configured to display a plurality of additional first numeric codes representative of a plurality of additional vehicle personalization features, individual ones of the additional first numeric codes displayed in response to a second setting of the switch, the multifunctional display further configured to display a sequence of second numeric codes representative of a sequence of modes of the displayed one of the first vehicle personalization feature or the plurality of additional vehicle personalization features in response to a second application of the first setting of the switch, each of individual ones of the sequence of second numeric codes displayed in response to sequential applications of the second setting of the switch; and
an electronic module coupled to the switch and configured to set a selected mode in response to a third application of the first setting of the switch.

11. The mechanism of claim 10 wherein the multifunctional switch comprises an odometer trip reset switch.

12. The mechanism of claim 11 wherein the multifunctional display comprises an odometer display.

13. The mechanism of claim 12 wherein the first setting of the switch comprises a closing of the switch for a first predetermined length of time and the second setting of the switch comprises the closing of the switch for a second predetermined length of time less than the first predetermined length of time.

14. The mechanism of claim 12 wherein the multifunctional display comprises a display of a first numeric code and a second numeric code in which each of the individual ones of the first numeric codes is highlighted unless selected and one of the sequence of second numeric codes is highlighted if the one of the sequence of second numeric codes represents a currently selected mode.

15. A mechanism for changing vehicle personalization features comprising:
a multifunctional switch;
a multifunctional display coupled to the switch, the display comprising a first main menu display and a second sub-menu display, the first main menu display configured to display a sequence of numeric codes representative of a sequence of settable vehicle personalization features in response to signals from the switch, and the second sub-menu display configured to display a sequence of second numeric codes representative of a sequence of selectable modes of the settable vehicle personalization features in response to additional signals from the switch; and an electronic module coupled to the switch and configured to set a selected mode of a settable vehicle personalization feature in response to a further signal from the switch.

16. The mechanism of claim 15 wherein the multifunctional switch comprises an odometer trip reset switch and the multifunctional display comprises an odometer display.

17. A method for programming personalization features of a motor vehicle comprising the steps of:

pressing and holding a single multifunctional switch for a first predetermined length of time to cause a multifunctional display to display a first numeric code representative of a first settable personalization feature and a second numeric code representative of a presently set mode of the displayed personalization feature;

tapping the single multifunctional switch multiple times to change the multifunctional display to sequentially display first numeric codes of a sequence of additional settable personalization features and a second numeric code representative of a presently set mode of each of the displayed personalization features;

pressing and holding the single multifunctional switch for a second predetermined length of time when the first numeric code of a personalization feature to be changed is displayed and then tapping the single multifunctional switch multiple times to change the multifunctional display to sequentially display second numeric codes representative of a sequence of modes of the displayed personalization feature; and pressing and holding the single multifunctional switch for a third predetermined length of time when the second numeric code representing a desired mode of the displayed personalization feature is displayed to select that desired mode.

18. The method of claim 17 wherein the step of pressing and holding a single multifunctional switch for a first predetermined length of time comprises the step of pressing and holding an odometer trip reset switch to cause an odometer display to display a highlighted first numeric code and a second numeric code.

19. The method of claim 18 wherein the step of tapping the single multifunctional switch multiple times comprises the step of tapping the odometer trip reset switch multiple times to change the odometer display to sequentially display first numeric codes of a sequence of additional settable features, the display being highlighted to indicate the additional personalization features are selectable, and a second numeric code representative of a presently set mode of each of the displayed personalization features.

20. The method of claim 19 wherein the step of pressing and holding the single multifunctional switch for a second predetermined length of time comprises the step of pressing and holding the odometer trip reset switch for a second predetermined length of time when the highlighted first numeric code of a personalization feature to be changed is displayed and then tapping the odometer trip reset switch multiple times to change the odometer display to sequentially display highlighted second numeric codes representative of a sequence of modes of the displayed personalization feature.

21. The method of claim 18 wherein the step of pressing and holding a single multifunctional switch for a second predetermined length of time comprises the step of pressing and holding the odometer trip reset switch to cause the odometer display to display a first numeric code indicative of a currently selectable personalization feature and a highlighted second numeric code.

22. The method of claim 21 wherein the step tapping the single multifunctional switch multiple times comprises the step of tapping the odometer trip reset switch multiple times to display in sequence highlighted second numeric codes representative of selectable modes for the currently selected personalization feature.

23. A method for programming personalization features of a motor vehicle comprising the steps of:

pressing and holding an odometer trip reset switch for a first predetermined length of time to cause an odometer display to display a first numeric code that is highlighted and a second numeric code;

tapping the odometer trip reset switch multiple times to change the odometer display to sequentially display first numeric codes of a sequence of additional settable features and a second numeric code representative of a presently set mode of each of the displayed features;

pressing and holding the odometer trip reset switch for a second predetermined length of time, when the first numeric code of a feature to be changed is displayed and then tapping the odometer trip reset switch to display in sequence second numeric codes that are highlighted representative of selectable modes for a currently selected feature; and pressing and holding the odometer trip reset switch for a third predetermined length of time, when the first numeric code and a second numeric code that is highlighted is displayed, to select the mode represented by the second numeric code as the desired mode.

24. The method of claim 23 wherein the step of pressing and holding the odometer trip reset switch for a third predetermined length of time comprises the step of pressing and holding the odometer trip reset switch for a third predetermined length of time to cause the odometer display to display a highlighted first numeric code and a second numeric code representative of the currently selected mode of the selectable personalization feature.

* * * * *